H. PAULING.
PROCESS OF PRODUCING NITRIC OXID FROM MIXTURES OF NITROGEN AND OXYGEN AND APPARATUS THEREFOR.
APPLICATION FILED SEPT. 27, 1910.
991,357.　　　　　　　　　　　　　　　Patented May 2, 1911.
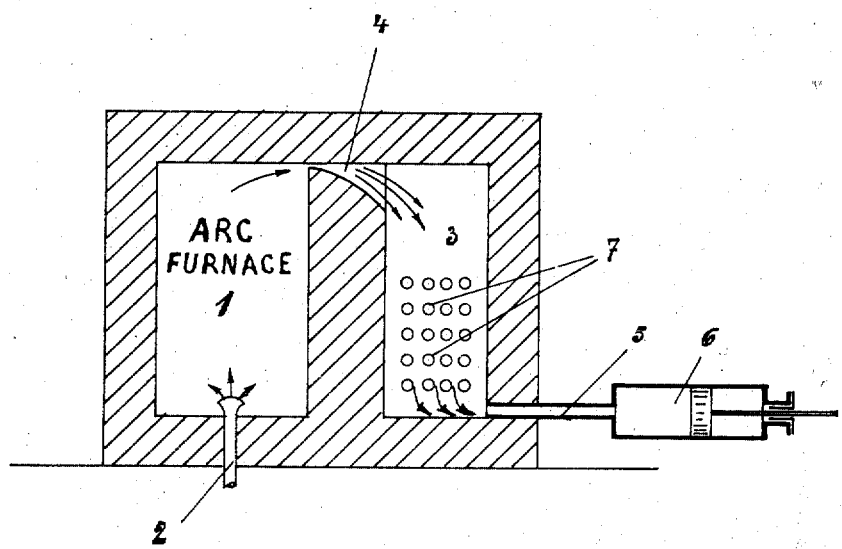
WITNESSES:
John H. Hoving.
INVENTOR:
HARRY PAULING
by　　　　　
Attorney.

UNITED STATES PATENT OFFICE.

HARRY PAULING, OF GELSENKIRCHEN, GERMANY, ASSIGNOR TO SALPETERSÄURE-INDUSTRIE-GESELLSCHAFT, GESELLSCHAFT MIT BESCHRÄNKTER HAFTUNG, OF GELSENKIRCHEN, GERMANY.

PROCESS OF PRODUCING NITRIC OXID FROM MIXTURES OF NITROGEN AND OXYGEN AND APPARATUS THEREFOR.

991,357.  Specification of Letters Patent.  Patented May 2, 1911.

Application filed September 27, 1910. Serial No. 584,121.

*To all whom it may concern:*

Be it known that I, HARRY PAULING, manager, a subject of the King of Saxony, residing at 84 Wilhelmstrasse, Gelsenkirchen IV, in the Kingdom of Prussia, German Empire, have invented a new and useful Improvement in Processes of Producing Nitric Oxid from Mixtures of Nitrogen and Oxygen and Apparatus therefor; and I do hereby declare the following to be a full, clear, and exact description of the same.

This invention relates to processes of treating gases and apparatus therefor; and it comprises a process wherein a gaseous mixture, specifically a mixture comprising nitrogen and oxygen, is heated to a reacting temperature, is thereafter permitted to expand without material reduction in temperature, additional heat being supplied if desired during such expansion, and is finally cooled; and it also comprises apparatus suitable for carrying out the foregoing process comprising a reaction furnace, an expansion chamber in communication with said furnace, means for permitting expansion of hot gases from said furnace into said reaction chamber without cooling during such expansion, special heating means being provided if desired, and means for cooling the hot expanded gases; all as more fully hereinafter set forth and as claimed.

In producing oxids of nitrogen, it is customary to heat gaseous mixtures comprising nitrogen and oxygen, commonly by means of an electric arc, to a temperature sufficiently high to bring about the desired reaction, and then to cool the hot reaction gases to obtain a mixture containing more or less of the oxids. The processes heretofore employed however have proved expensive and of relatively low efficiency. At ordinary temperatures there is very little tendency for nitrogen and oxygen to combine, the reaction, if any, being so slow as to be practically imperceptible. With increase in temperature however, the speed of the reaction increases rapidly, and at relatively high temperatures becomes quite great. At all temperatures at which nitrogen and oxygen react with each other, the reaction is reversible to a greater or less extent; *i. e.*, the oxids formed tend to decompose more or less into free nitrogen and oxygen. But at exceedingly high temperatures, such as are obtained in the electric arc for example, this backward tendency of the reaction is comparatively small; the reaction proceeds forward almost entirely, and there is little decomposition of the oxids. And at temperature considerably below that of the arc, there is also relatively little tendency toward decomposition of the oxids. At any intermediate temperature however, when the system is in equilibrium, there is a considerable amount of uncombined nitrogen and oxygen on one side of the reaction equation, as well as a definite amount of nitrogen oxids on the other side. And at the same time the velocity of the decomposing reaction is very high. Obviously therefore it would be exceedingly advantageous if the extremely hot gaseous mixture high in oxids of nitrogen coming from the arc could be treated in such a manner that its temperature would be reduced to a point at which there is substantially no tendency for the oxids to decompose, without at the same time encountering the unfavorable conditions existing in the intermediate range of temperatures above referred to. Attempts have heretofore been made to accomplish this end by suddenly cooling the gases by drawing them from the arc through a cooled pipe in which the gaseous mixture is subjected to a sudden drop in temperature, the idea being to avoid the decomposition of oxids incident to temperatures between that of the arc and those at which there is practically no decomposition, by passing over this dangerous range of temperatures as rapidly as possible. For several reasons, these attempts have been relatively unsuccessful. In the first place, the speed of cooling, even under the most favorable conditions, is relatively extremely small as compared with the speed of the retrogressive or decomposing reaction at the high temperatures necessarily passed over during the cooling. Consequently it is impossible to cool the gases under the conditions heretofore proposed with sufficient speed to avoid very considerable decomposition of the oxids during the cooling step. The formation of oxids is an endothermic reaction of gases; that is, it is a heat-consuming reaction and is subject to the same laws as other reactions of the same nature.

Furthermore in cooling the gaseous mixture in the manner described, the arc itself is also cooled, and of course this is disadvantageous.

The object of the present invention is to obviate these disadvantages by reducing the decomposition speed of the gases, before the cooling process, and the novel feature of the improved process consists substantially in subjecting the heated mixture to expansion without materially reducing its temperature during such expansion. For this purpose the heated mixture may be introduced into a chamber in which the pressure is reduced to about 400 mm. mercury, this chamber being heated if necessary to maintain the temperature of the mixture during the expansion of the latter therein. After the expansion, the gases are cooled. The reaction velocity is greatly reduced by the expansion, being under the present conditions probably approximately proportional to the square of the pressure. On the other hand, the reaction equilibrium is practically undisturbed since the temperature is not allowed to drop during the expansion. Consequently the proportions of nitrogen oxids produced by the reaction at the highest temperatures are maintained substantially constant during the subsequent cooling, the resulting cooled gaseous mixture being substantially as rich in oxids of nitrogen as the intensely hot mixture at the electrodes.

In applying my new process to the manufacture of nitrogen oxids where gaseous mixtures containing nitrogen and oxygen are subjected to the action of an electric arc, I find it best to form the arc and introduce the gases thereinto at approximately normal pressure. After treatment in the arc, the intensely hot gases are then permitted to expand into a chamber in which a partial vacuum is maintained, without material reduction in their temperature. Reduction in the temperature of the hot gases may be prevented either by supplying additional heat to the gases during the expansion, or by throttling their flow into the expansion chamber. The pressure in the expansion chamber should be relatively low, and for the best results should not be over 400 millimeters of mercury. Still lower pressures are even better.

Various methods may be used for heating during the expansion. One method consists in introducing a suitable proportion of combustible gas into the stream of intensely hot, expanding mixture (which, as is known, must contain a considerable excess of oxygen), so that combustion takes place and compensates for the fall of temperature due to expansion. The amount of added gas need only be in such proportion as to consume a very small amount of the available oxygen. Or a flame arc between water-cooled platinum electrodes or the like may be placed in the chamber or the latter may be heated by means of heating conduits in its walls. It is, in practice, well to maintain the gases during the expansion at a temperature of about 2,000° C. Among other materials, magnesia is capable of resisting this temperature, and is suitable for the walls of the expansion chamber.

One of the many forms of apparatus suitable for the purpose of the invention is diagrammatically illustrated in the annexed drawing, which is a sectional view. In the type of apparatus here shown, drop in temperature of the expanding gases is prevented by throttling their flow into the expansion chamber.

In the drawing 1 represents the reaction chamber or furnace, to which the air or other mixture of nitrogen and oxygen is supplied through the pipe 2, and whence the reaction mixture resulting from the action of the arc or other heating means (not shown), passes through the flared duct 4 to the vacuum chamber 3. As indicated, the end of the conduit nearest the reaction chamber is very constricted so as to give the desired throttling effect. If the heat from the chamber 1 is not sufficient to maintain the requisite temperature in the chamber 3, the latter may be heated by means of heating conduits or equivalent means (not known), to prevent fall of temperature during the expansion. In the type of apparatus shown, supplemental heating means are not usually necessary unless the expansion chamber is at such a distance from the furnace that radiation losses become excessive. A pump 6 connected to the chamber 3 by a pipe 5, serves to maintain the desired degree of reduced pressure in the expansion chamber, and the lower part of the chamber contains cooling means, diagrammatically shown at 7, by which the hot expanded air is cooled.

What I claim is:—

1. The process of producing useful products from a gaseous mixture, which comprises causing a reaction between constituents of such mixture by heating to a reacting temperature, and then obtaining such useful products by permitting the heated mixture to expand without substantial reduction in temperature during expansion in order to prevent material decomposition of the reaction products.

2. The process of producing oxids of nitrogen, which comprises forming oxids of nitrogen by heating a gaseous mixture comprising nitrogen and oxygen to a reacting temperature, and then permitting such heated mixture to expand without substantial reduction in temperature during expansion.

3. The process of producing oxids of nitrogen, which comprises heating a gaseous mixture comprising nitrogen and oxygen to a reacting temperature, permitting such heated mixture to expand while maintaining the temperature above that at which material decomposition of said oxides occurs, and subsequently cooling the expanded mixture.

4. The process of producing oxids of nitrogen, which comprises subjecting a gaseous mixture comprising nitrogen and oxygen to the heating action of an arc to form oxids of nitrogen, and permitting a throttled expansion of the resulting hot gaseous mixture without material reduction in temperature during such expansion.

5. The process of producing oxids of nitrogen, which comprises subjecting a gaseous mixture comprising nitrogen and oxygen to the heating action of an arc, permitting a throttled expansion of the resulting hot gaseous mixture without material reduction in temperature, and thereafter cooling the expanded gases to a temperature below that at which material decomposition of nitrogen oxids occurs.

6. The process of producing oxids of nitrogen, which comprises forming oxids of nitrogen by heating a gaseous mixture comprising nitrogen and oxygen to a reacting temperature, and then permitting the heated mixture to expand under reduced pressure without material reduction in temperature during the expansion.

7. The process of producing oxids of nitrogen, which comprises heating a gaseous mixture comprising nitrogen and oxygen to a reacting temperature, permitting the heated mixture to expand under reduced pressure without material reduction in temperature during the expansion, and thereafter cooling the hot expanded mixture.

8. The process of producing oxids of nitrogen, which comprises passing a mixture comprising nitrogen and oxygen through an arc to form oxids of nitrogen, permitting the resulting hot gaseous mixture to expand substantially isothermally through a constricted passage into an expansion chamber in which a partial vacuum is maintained, and thereafter cooling the expanded mixture.

9. In apparatus for making oxids of nitrogen, means for heating mixed gases comprising nitrogen and oxygen to a reacting temperature, in combination with means for permitting hot gases from said heating means to expand without reduction in temperature during the expansion.

10. In apparatus for treating gases, means for heating mixed gases to a reacting temperature, and means for permitting the hot reaction gases from said heating means to expand without material reduction in temperature.

11. In apparatus for treating gases, means for heating mixed gases to a reacting temperature, means for permitting the hot reaction gases from said heating means to expand without material reduction in temperature, and means connected to said expansion means for cooling such expanded gases.

12. In apparatus for making oxids of nitrogen, a reaction furnace, an expansion chamber communicating with said furnace into which hot reaction gases from said furnace may expand, means to prevent reduction in the temperature of such gases during expansion, and means connected to said expansion chamber for cooling the expanded gases.

Dated this twelfth day of September 1910.

In testimony whereof, I have signed my name to this specification in the presence of two subscribing witnesses.

HARRY PAULING.

Witnesses:
MATHILDE K. HELD,
A. V. W. COTTER.